US011818226B2

(12) United States Patent
Kawahata

(10) Patent No.: US 11,818,226 B2
(45) Date of Patent: Nov. 14, 2023

(54) MANAGEMENT SYSTEM, MANAGEMENT APPARATUS, MANAGEMENT METHOD, AND STORAGE MEDIUM STORING PROGRAM

(71) Applicant: CANON KABUSHIKI KAISHA, Tokyo (JP)

(72) Inventor: Ryo Kawahata, Kamakura (JP)

(73) Assignee: Canon Kabushiki Kaisha, Tokyo (JP)

( * ) Notice: Subject to any disclaimer, the term of this patent is extended or adjusted under 35 U.S.C. 154(b) by 81 days.

(21) Appl. No.: 16/907,575

(22) Filed: Jun. 22, 2020

(65) Prior Publication Data

US 2020/0412815 A1 Dec. 31, 2020

(30) Foreign Application Priority Data

Jun. 26, 2019 (JP) .................................. 2019-119111

(51) Int. Cl.
*H04L 67/51* (2022.01)
*G06F 3/12* (2006.01)
*H04L 67/60* (2022.01)

(52) U.S. Cl.
CPC ............ *H04L 67/51* (2022.05); *G06F 3/1203* (2013.01); *G06F 3/126* (2013.01); *G06F 3/1231* (2013.01); *G06F 3/1268* (2013.01); *G06F 3/1291* (2013.01); *H04L 67/60* (2022.05)

(58) Field of Classification Search
CPC ..... H04L 67/16; G06F 3/1203; G06F 3/1231; G06F 3/126; G06F 3/1268; G06F 3/1291
See application file for complete search history.

(56) References Cited

U.S. PATENT DOCUMENTS

| 10,521,167 | B2 * | 12/2019 | Mori ...................... G06F 3/1238 |
| 10,771,649 | B2 | 9/2020 | Kawahata | |
| 2003/0149573 | A1 * | 8/2003 | Lynton ................... G06Q 30/06 |
| | | | 705/302 |
| 2010/0265529 | A1 * | 10/2010 | Katano ................. G06F 3/1285 |
| | | | 358/1.14 |
| 2011/0235085 | A1 * | 9/2011 | Jazayeri ............... G06F 3/1238 |
| | | | 358/1.14 |
| 2013/0235418 | A1 * | 9/2013 | Tanaka ................... H04L 63/08 |
| | | | 358/1.15 |

(Continued)

FOREIGN PATENT DOCUMENTS

| EP | 1365557 B1 * | 4/2007 | ............. H04L 29/06 |
| JP | 2003-296435 A | 10/2003 | |

(Continued)

OTHER PUBLICATIONS

Japanese Office Action dated Feb. 27, 2023 in counterpart Japanese Patent Appln. No. 2019-119111.

*Primary Examiner* — Mohamed A. Wasel
*Assistant Examiner* — Tesfu N Mekonen
(74) *Attorney, Agent, or Firm* — Venable LLP

(57) ABSTRACT

After receiving from a device a request to register the device, a management apparatus issues service-specific identification information for identifying the device in a server that provides a service, and manages the issued service-specific identification information in association with the service. The management apparatus issues common service-specific identification information for grouped services among a plurality of services.

13 Claims, 11 Drawing Sheets

(56) References Cited

U.S. PATENT DOCUMENTS

| | | | | |
|---|---|---|---|---|
| 2015/0015908 A1* | 1/2015 | Tanaka | ............... | H04N 1/32106 358/1.14 |
| 2015/0036191 A1* | 2/2015 | Suzuki | .................. | G06F 3/1205 358/1.15 |
| 2015/0124282 A1* | 5/2015 | Minagawa | ............ | G06F 3/1267 358/1.15 |
| 2018/0212950 A1* | 7/2018 | Nogawa | ............. | H04N 1/00244 |
| 2019/0129669 A1* | 5/2019 | Takahashi | .............. | G06F 3/1222 |
| 2020/0076803 A1* | 3/2020 | Saito | ..................... | G06F 3/1254 |

FOREIGN PATENT DOCUMENTS

| | | | | |
|---|---|---|---|---|
| JP | 2018092558 A | | 6/2018 | |
| WO | WO-2012108547 A2 * | | 8/2012 | ........... G06F 3/1204 |

* cited by examiner

FIG. 5A

| DEVICE ID | SERIAL NUMBER | MAC ADDRESS | MODEL NUMBER | STATUS |
|---|---|---|---|---|
| Device_a | AAAA00000 | AABBCC112233 | X series | |
| Device_b | BBBB00000 | DDEEFF445566 | Y series | |

FIG. 5B

| DEVICE ID | SERVICE-SPECIFIC DEVICE ID | SERVICE ID | TRANSMISSION DESTINATION INFORMATION (URL) |
|---|---|---|---|
| Device_a | Service_Device_1 | Service_a | https://service_a.com/ |
| Device_a | Service_Device_1 | Service_b | https://service_b.com/ |
| Device_a | Service_Device_2 | Service_c | https://service_c.com/ |
| Device_b | Service_Device_3 | Service_a | https://service_c.com/ |

FIG. 5C

| SERVICE GROUP ID | SERVICE ID | ASSOCIATION TYPE |
|---|---|---|
| Group_a | Service_a, Service_b | DEPENDENT |
| Group_b | Service_c | INDEPENDENT |

FIG. 5D

| ASSOCIATION ID | DEVICE ID | EXPIRATION DATE |
|---|---|---|
| Connect_a | Device_a | 2019/05/16 10:00:00 |
| Connect_b | Device_b | 2019/05/17 15:30:00 |

MANAGEMENT SYSTEM, MANAGEMENT APPARATUS, MANAGEMENT METHOD, AND STORAGE MEDIUM STORING PROGRAM

BACKGROUND OF THE INVENTION

Field of the Invention

The present invention relates to a management system for managing services and devices, a management apparatus, a management method, and a storage medium for storing a program.

Description of the Related Art

An image processing apparatus such as a printer can be linked with various Web services via a network. In cooperation with a Web service, the user must connect a printer to a network and register it in a management system. Japanese Patent Laid-Open No. 2018-92558 discloses a configuration in which a management system performs processing, for each web service, for registering or withdrawing a printer.

However, in Japanese Patent Laid-Open No. 2018-92558, a case where a device such as a printer is linked to a plurality of Web services is not envisioned. Therefore, there is a possibility that at least one of a service and an image processing apparatus cannot be efficiently managed.

SUMMARY OF THE INVENTION

The present invention provides to a management system for simplifying management of a device between services, a management apparatus, a management method, and a storage medium for storing a program.

The present invention in one aspect provides a management system comprising a management apparatus operable to manage a device in association with a service, the device, and a server operable to provide the service, wherein the device comprises: a first transmission unit configured to transmit to the management apparatus a request to register the device, the management apparatus comprises: an issuing unit configured to, after receiving the request to register the device from the device, issue service-specific identification information for identifying the device in the server; and a management unit configured to manage the service-specific identification information issued by the issuing unit in association with the service, and wherein the issuing unit issues common service-specific identification information for grouped services among a plurality of services.

By virtue of the present invention, that at least one of a service and an image processing apparatus can be efficiently managed.

Further features of the present invention will become apparent from the following description of exemplary embodiments with reference to the attached drawings.

BRIEF DESCRIPTION OF THE DRAWINGS

FIG. 5A to FIG. 5D are diagrams showing tables stored in a database of a management server.

DESCRIPTION OF THE EMBODIMENTS

Figure 1:
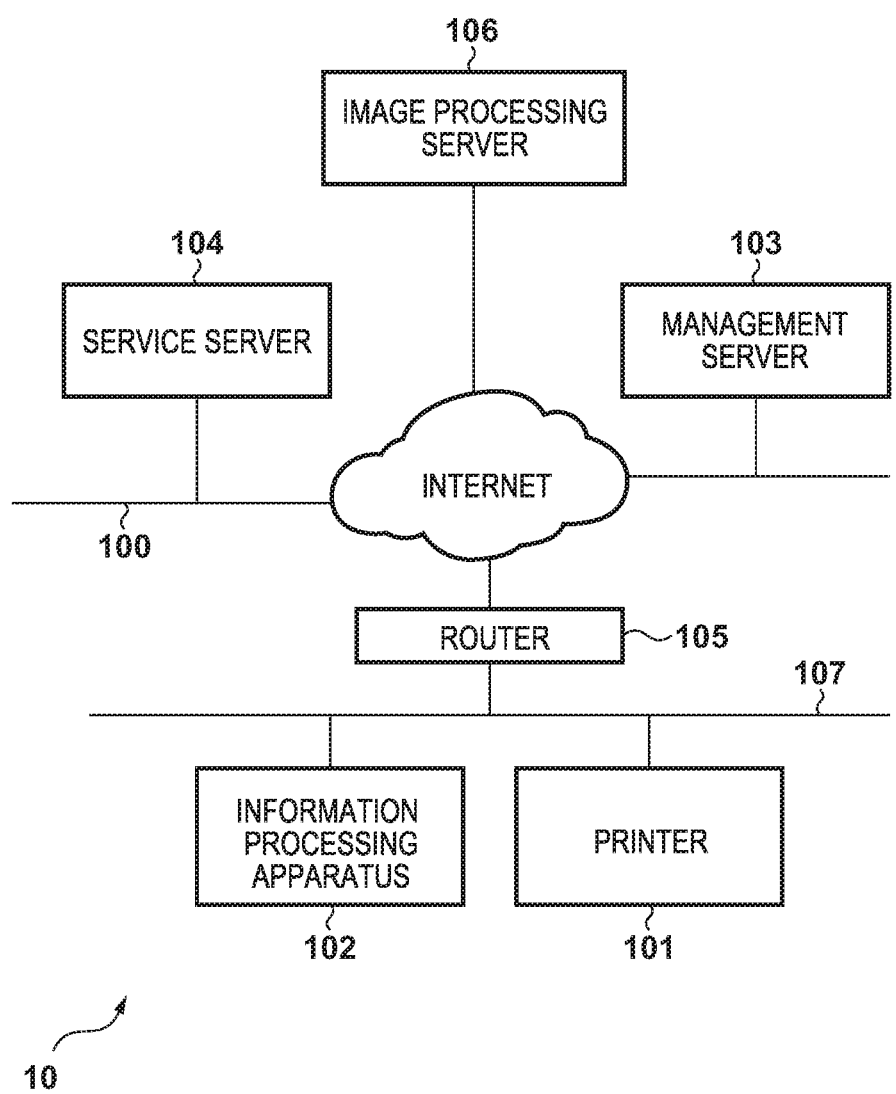
FIG. 1 is a block diagram showing a configuration of a network system.

Hereinafter, embodiments will be described in detail with reference to the attached drawings. Note, the following embodiments are not intended to limit the scope of the claimed invention. Multiple features are described in the embodiments, but limitation is not made an invention that requires all such features, and multiple such features may be combined as appropriate. Hereinafter, embodiments will be described in detail with reference to the attached drawings. Furthermore, in the attached drawings, the same reference numerals are given to the same or similar configurations, and redundant description thereof is omitted.

First Embodiment

<System Configuration>

FIG. 1 is a block diagram illustrating an example of a configuration of a client-server type network system according to the present embodiment. A system 10 illustrated in FIG. 1 includes a printer 101, an information processing apparatus 102, a management server 103, a service server 104, a router 105, and an image processing server 106. The system 10 may also be referred to as a management system. The printer 101 and the information processing apparatus 102 are, for example, interconnected at one location via a network 107 such as a LAN. Further, the printer 101 and the information processing apparatus 102 are able to, through the router 105 and the Internet 100, connect, for example, to a management server 103, a service server 104, and an image processing server 106 which are external to this location. Communication between respective servers is performed by HTTP/HTTPS, for example.

The service server 104 is a server that provides a Web service such as, for example, an encryption service and a filtering service. The image processing server 106 is a server that provides various image processing services such as template compositing. The management server 103 is a server for comprehensively managing services and devices in the system 10.

Although the management server 103 is illustrated as one server in FIG. 1, the management server 103 may be configured as a plurality of servers such as a device management server and a service management server. Further, although one of each of the service server 104 and the image processing server 106 are shown for the purposes of explanation, each may be constituted by a plurality of servers, and a plurality of services may be provided by a single service server 104. Further, the number of printers 101 connected to the management server 103 may be a plurality.

<Printer Hardware Configuration>

Figure 2:
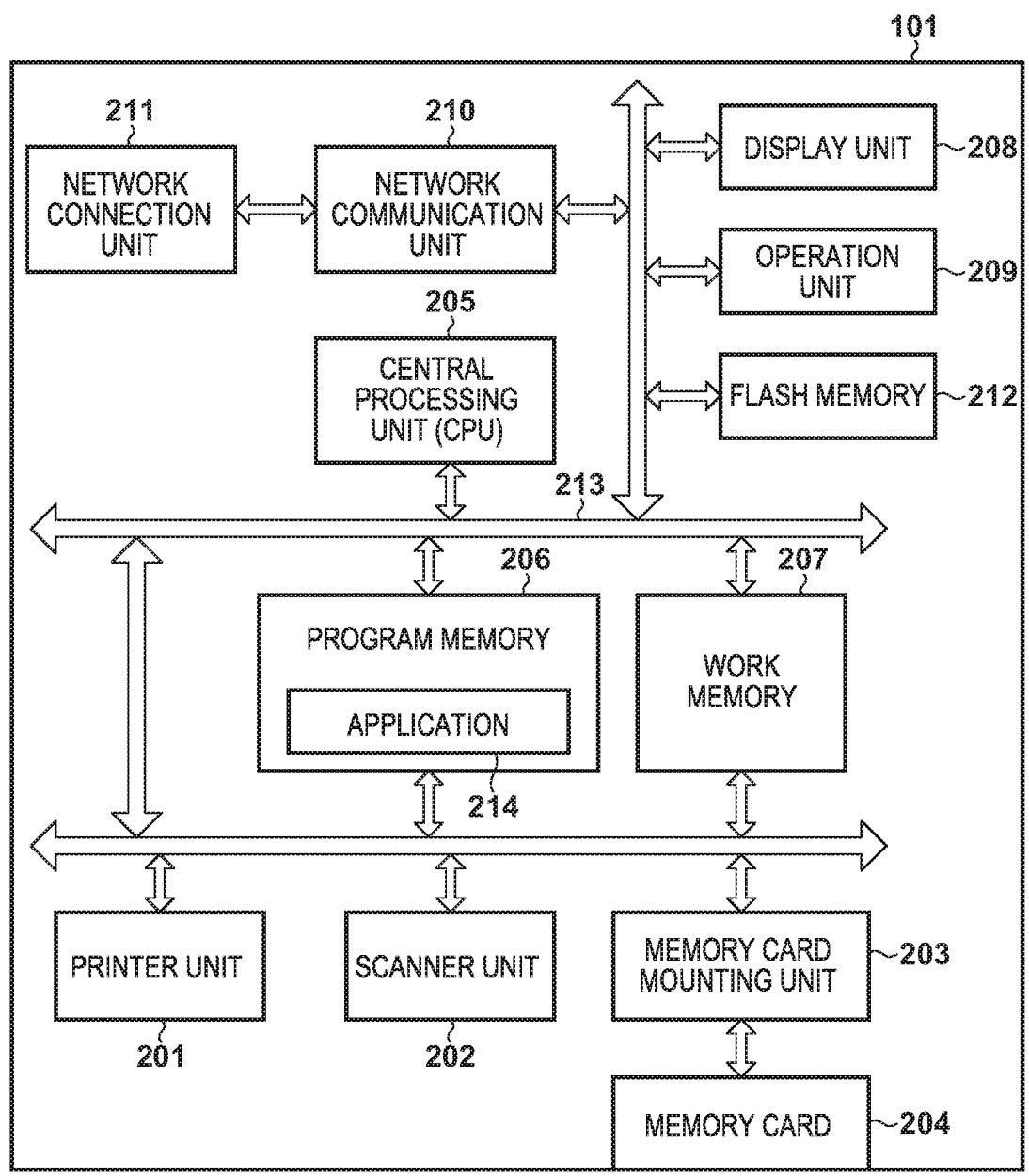
FIG. 2 is a block diagram showing a hardware configuration of a printer.

FIG. 2 is a block diagram showing a hardware configuration of the printer 101. In the present embodiment, the printer 101 is described as an MFP (Multi-Functional Printer) in which a plurality of functions such as a print function and a scanner function are integrally combined. In the printer 101, a print function is realized by a printer unit 201, a scanner function is realized by a scanner unit 202, and a storage function is realized by a memory card mounting unit 203 and a memory card 204.

For example, the printer unit 201 prints image data received from the outside or image data stored in the memory card 204 on a print medium such as a print sheet by a printing method such as an inkjet printing method or an electrophotographic method. In addition, the printer unit 201 manages ink information such as a remaining amount of ink and sheet information such as a number of stacked sheets as consumable information.

The scanner unit 202 optically reads a document set on a document table (not shown) to convert the document into electronic data, and transmits image data converted into a specified file format to an external apparatus via a network or stores the image data in a storage area such as an HDD. Further, a copy service is realized by image data generated by reading a document placed on the document table by the scanner unit 202 being transferred to the printer unit 201, and the printer unit 201 printing image data onto a print sheet.

Various file data is stored in the memory card 204 which is mounted in the memory card mounting unit 203. File data can be read out and edited from an external apparatus via the network. It is also possible to store file data from an external apparatus to the memory card 204.

The printer 101 includes a CPU 205, a program memory 206, a work memory 207, a display unit 208, an operation unit 209, a network communication unit 210, a network connection unit 211, and a flash memory 212. The CPU 205 is a central processing unit for comprehensively controlling each unit in the printer 101. The program memory 206 is configured by a ROM or the like, and stores a variety of program codes and an application 214 for communicating with each server. Further, the application 214 can access the printer unit 201 to acquire consumable information such as ink information and sheet information. The work memory 207 is configured by a RAM or the like, and temporarily stores or buffers, for example, image data or the like for a time of execution of a respective service.

The display unit 208 is configured by, for example, an LCD, and displays various types of information such as a user interface screen. The operation unit 209 is configured by including switches and the like for accepting various user operations. The network communication unit 210 connects the printer 101 to a network for various communication. The network communication unit 210 can be connected to an external network via the network connection unit 211. The network communication unit 210 can support a wired LAN or a wireless LAN. For example, in a case of supporting a wired LAN, the network connection unit 211 is a connector for connecting a cable for a wired LAN, and the network connection unit 211 is an antenna for a case of supporting a wireless LAN. The flash memory 212 is a nonvolatile memory for storing, for example, image data received by the network communication unit 210. Each unit described above is connected to each other via a bus 213.

<Information Processing Apparatus Hardware Configuration>

Figure 3:
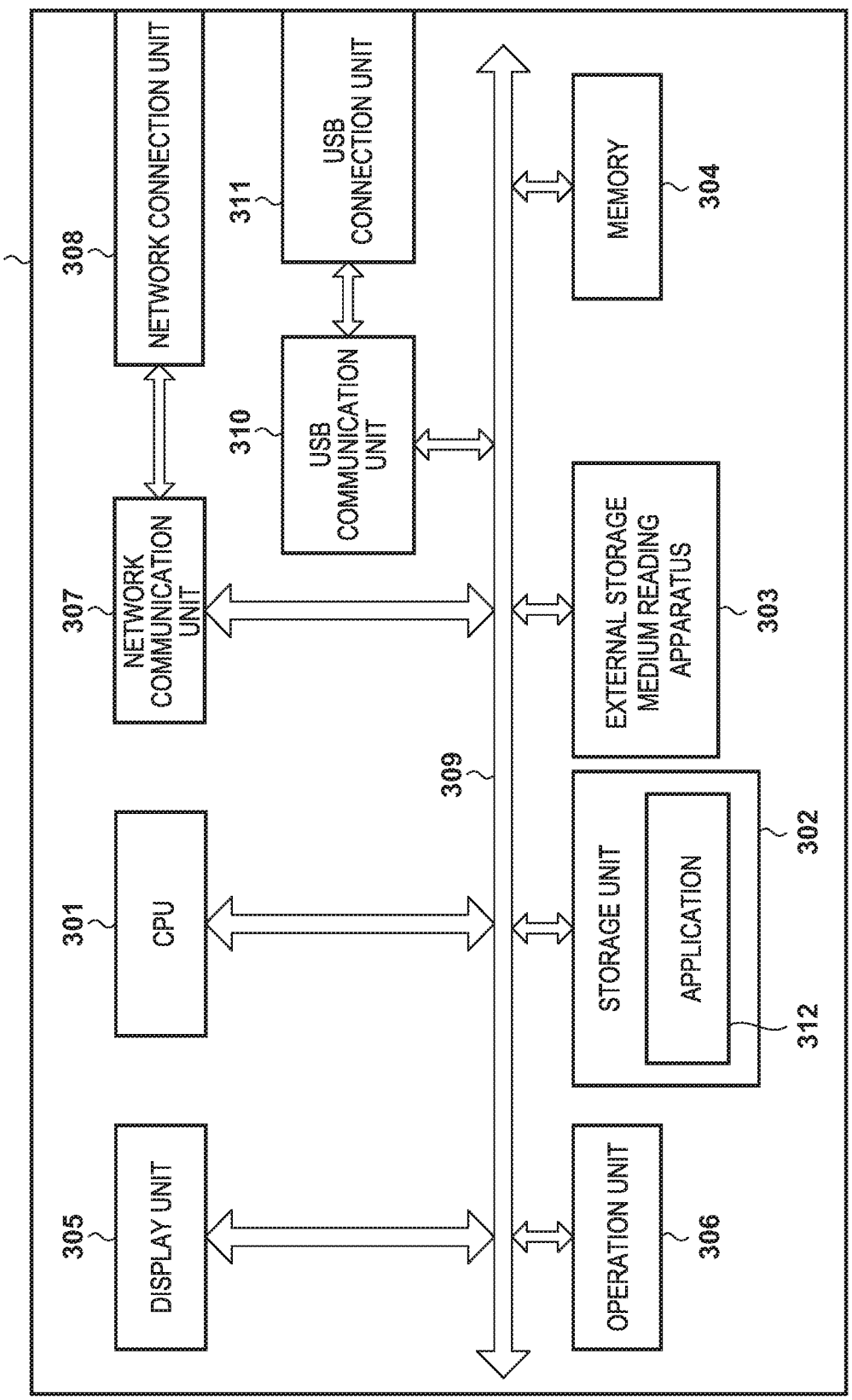
FIG. 3 is a block diagram showing a hardware configuration of an information processing apparatus.

FIG. 3 is a block diagram showing a hardware configuration of the information processing apparatus 102. The CPU 301 is a central processing unit for comprehensively controlling the information processing apparatus 102. A storage unit 302 stores, in addition to various files and data, an application program 312 that the CPU 301 reads out and executes, and an OS. An external storage medium reading apparatus 303 is a device for reading out information such as a file stored in an external storage medium such as an SD card. A memory 304 is configured by a RAM or the like, and is used when the CPU 301 performs, for example, temporary storage or buffering of data as needed.

The display unit 305 is configured by, for example, an LCD, and displays various types of information such as a user interface screen. The operation unit 306 is configured by including a mouse, keyboard, or the like for accepting various user operations. The network communication unit 307 can be connected to an external network via the network connection unit 308, and performs various communication. The network communication unit 307 can support a wired LAN or a wireless LAN. For example, in a case of supporting a wired LAN, the network connection unit 308 is a connector for connecting a cable for a wired LAN, and the network connection unit 308 is an antenna for a case of supporting a wireless LAN. A USB communication unit 310 is connected to various peripheral devices via a USB connection unit 311 to perform USB communication. Each unit described above is connected to each other via a bus 309.

<Server Hardware Configuration>

Figure 4:
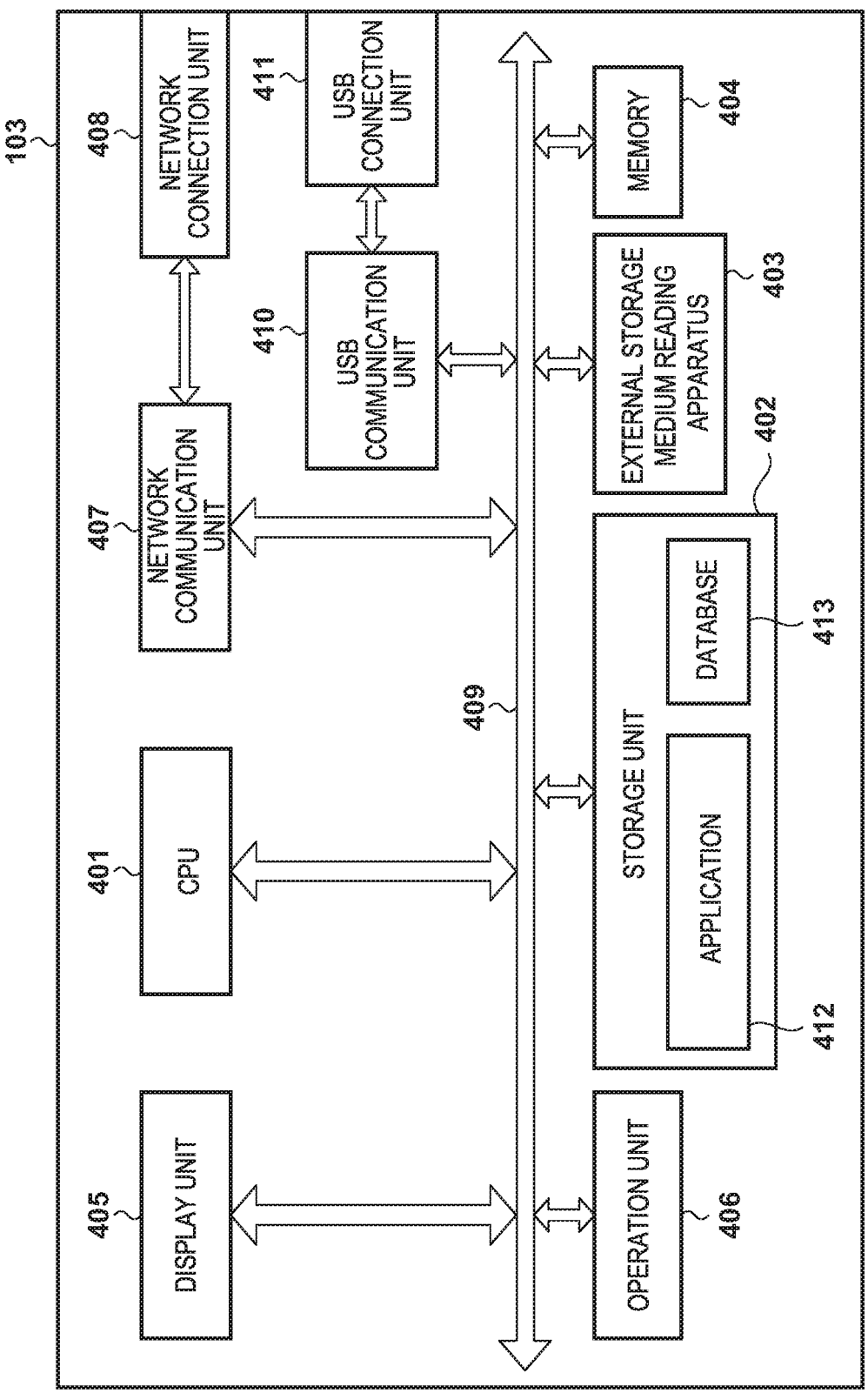
FIG. 4 is a block diagram showing a hardware configuration of a server.

FIG. 4 is a block diagram illustrating a hardware configuration of the management server 103, the service server 104, and the image processing server 106. The hardware configurations of the management server 103, the service server 104, and the image processing server 106 are the same unless otherwise noted.

Since a CPU 401 to an application 412 have the same description as the CPU 301 to application 312 of FIG. 3, the descriptions thereof will be omitted. However, in the present embodiment, the management server 103, a service server 1104, and the image processing server 106 include a database 413 in the storage unit 402, which is where a database corresponding to the functions of each server is constructed.

<About Tables Stored on the Management Server>

Hereinafter, the tables stored in the database 413 of the management server 103 according to the present embodiment will be described by referring to FIG. 5A to FIG. 5D. The management server 103 manages services provided by servers and devices such as the printer 101 in the system 10 using tables shown in FIG. 5A to FIG. 5D.

FIG. 5A illustrates an example of a device management table 500 managed by the management server 103. The device management table 500 includes items for a device ID 501, a serial number 502, a MAC address 503, a model number 504, and a status 505. The device ID 501 is identification information of the printer 101 in the management server 103 and is issued by the management server 103. The serial number 502, the MAC address 503, and the model number 504 are model information preset in the printer 101. Although the status 505 is shown as blank in FIG. 5A, it is status information of the printer 101 and stores the status of the apparatus, ink information, and the like.

The device management table 500 is a table for identifiably managing each device such as the printer 101. For example, in FIG. 5A, two printers 101 which are identified by two device IDs 501, Device_a and Device_b, are managed. Although the serial number 502, the MAC address 503, the model number 504, and the status 505 are shown in FIG. 5A, the information is not limited to the information of FIG. 5A as long as the information is unique to the printer 101, and other information may be included, for example.

FIG. 5B illustrates an example of a service management table 510 managed by the management server 103. The service management table 510 includes items: a device ID 511, a service-specific device ID 512, a service ID 513, and transmission destination information 514. The device ID 511 is identification information of the printer 101 and corresponds to the device ID 501 of the device management table 500. The service-specific device ID 512 is identification information for identifying the printer 101 in the service server 104, and is issued by the management server 103. The service ID 513 is identification information for identifying the service provided by the service server 104. The transmission destination information 514 is information related to a transmission destination for the service server 104 and is, for example, URL information. The management server 103 uses the URL information to notify the service server 104 of various information. For example, the URL information is used in the processing of FIG. 8 which is described later.

Description is given regarding the service-specific device ID 512. The service-specific device ID 512 is the same as the device ID 501 in terms of information for identifying the printer 101. Let us now consider, for example, a case where a single printer X is linked to a plurality of Web services A, B, and C that are grouped. In this case, printer X is registered to Web services A, B, and C, and printer X is managed by IDs used by respective Web services. For example, it is managed as printer X_A by the Web service A, managed as printer X_B by the Web service B, and managed as printer XS by the Web service C. When the printer X is managed by respective individual IDs, job management between Web services requires additional configuration, such as converting to a common ID. Therefore, in the present embodiment, a common ID is assigned in a plurality of grouped Web services A, B, and C, for example, a printer X_Service. Such a configuration enables job management between Web services to be simplified.

For example, in FIG. 5B, two services identified by Service_a and Service_b are grouped. Then, a service-specific device ID "Service_Device_1" for the common service is added to Device_a in Service_a and Service_b. Meanwhile, in Service_c which is not grouped, a different service-specific device ID "ServiceDevice_2" is added to Device_a. In Service_a, a service-specific device ID "Service_Device_3" that is different from the service-specific device ID of Device_a is assigned to Device_b. As described above, in the present embodiment, the service-specific device ID 512 is assigned to respective devices in units of service groups.

FIG. 5C illustrates an example of a group management table 520 managed by the management server 103. The group management table 520 includes items for a service group ID 521, a service ID 522, and an association type 523. The service group ID 521 is identification information for identifying a group to which a service that is identified by the service ID 513 belongs. The service ID 522 indicates the service ID 513 of a service that belongs to the service group ID 521. For example, FIG. 5C shows that Service_a and Service_b are grouped together and that that the group ID is "Group_a." The association type 523 indicates the type of association between the printer registration and the service registration, for example, a value of "dependent" or "independent" is stored. When the value "dependent" is stored, it indicates that registration of the printer 101 to the management server 103 is required when registering a service. Meanwhile, when the value "independent" is stored, this indicates that the service can be registered without registering the printer 101 to the management server 103. For example, an example of an independent service is an automatic delivery service for consumables. At a time of purchase of a printer at a store, a user subscribes to an automatic delivery service for consumables at the store. Accordingly, the user wishes to subscribe to the service while the printer is still unused. Therefore, an automatic delivery services for consumables is handled as independent as it does not require registration of a printer. On the other hand, in the case of a service for printing content that is specified on a server, printing cannot be started with a printer in an unregistered state, so such a service is treated as dependent.

FIG. 5D illustrates an example of an association ID management table 530 managed by the management server 103. The association ID management table 530 includes items for an association ID 531, a device ID 532, and an expiration date 533. The association ID 531 is temporary identification information of the printer 101 for registering a service. The device ID 532 is identification information of the printer 101 and corresponds to the device ID 501 of the device management table 500. The expiration date 533 indicates the expiration date of the association ID 531.

<Registration Process Executed by System>

Figure 6:
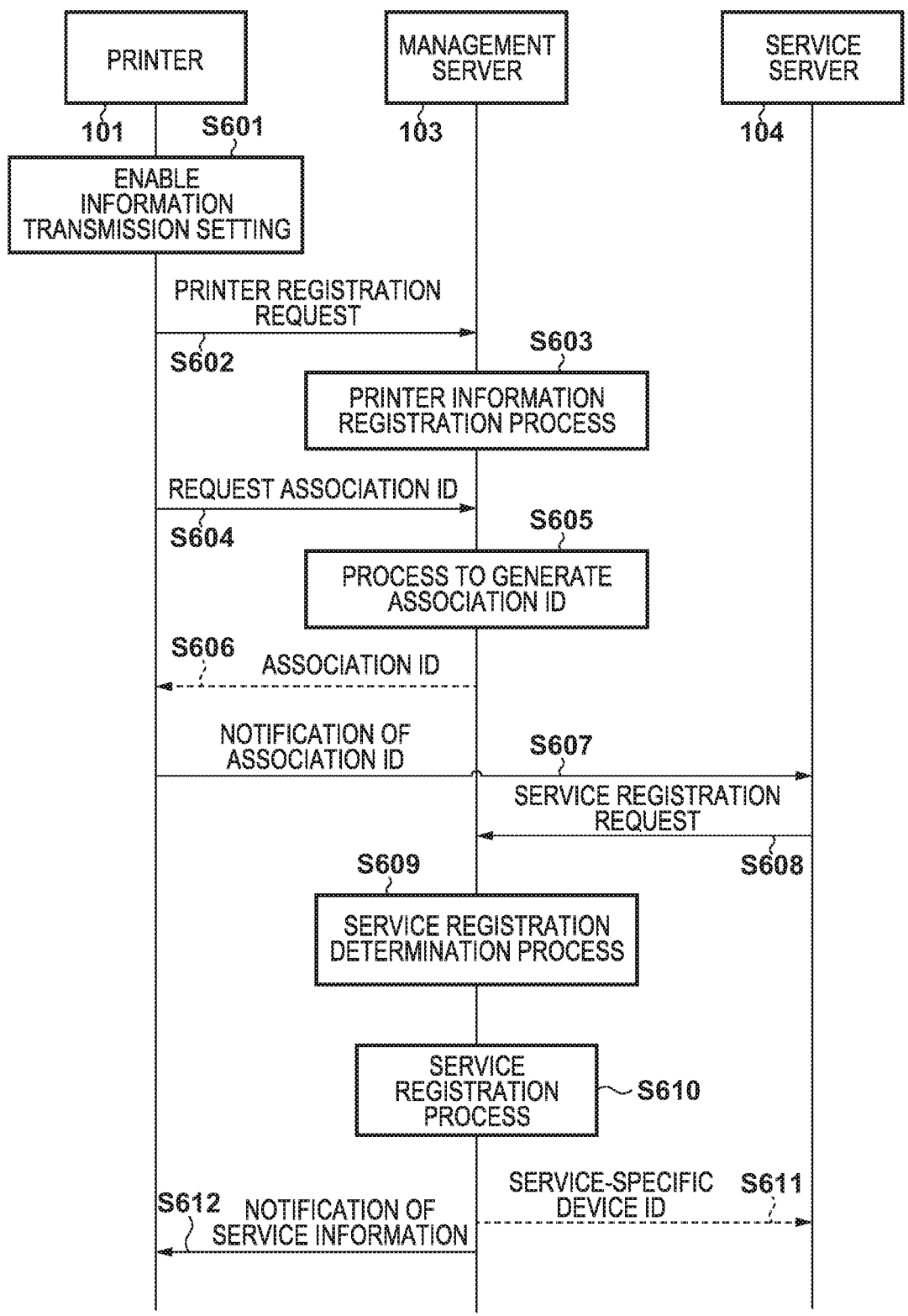
FIG. 6 is a sequence diagram of service registration.

Hereinafter, a process of registering the printer 101 and a process of registering a service in the system 10 will be described with reference to FIG. 6. Processing by the printer 101 of FIG. 6 is realized by the CPU 205 executing programs. Processing of the management server 103 and the service server 104 is realized by the CPU 401 of each server executing programs.

In step S601, the printer 101 detects an instruction operation on the operation unit 209 for the process of registering a printer. For example, the printer 101 detects an operation on the operation unit 209 by a user of enabling an information transmission setting. By this operation, the printer 101 can communicate with the management server 103. The printer 101 holds in advance the address of the management server 103. Note that, in step S601, the initialization of the printer 101, network connection of the printer, and the like have been completed through user operations or the like. The processing of step S601 is performed, for example, in a case where a purchased printer 101 is installed in the system 10 for the first time.

In step S602, the printer 101 transmits a printer registration request to the management server 103. At this time, the printer 101 transmits device information such as a serial number, a MAC address, and a model number of itself. In step S603, the management server 103, after generating the device ID 501, holds in association the device ID 501 and the device information (the serial number 502, the MAC address 503, and the model number 504) in the device management table 500 in FIG. 5A.

In step S604, the printer 101 transmits an association ID request to the management server 103. For example, the user enables the information transmission setting on the operation unit 209 as described above. When the user presses a button for registering the printer to the service enabled by this operation, the processing of step S604 and thereafter is executed. In step S605, the management server 103 performs processing for generating an association ID 531. At the time of the request of step S604, the printer 101 also transmits a serial number or the like of the printer. Therefore, the management server 103 refers to the device management table 500 to specify the device ID 501 from the serial number transmitted in step S604. The management server 103 refers to the association ID management table 530 of the FIG. 5D and determines whether or not a device ID 532 corresponding to the specified device ID 501 is registered in the association ID management table 530. When a corresponding device ID 532 is unregistered, a new association ID 531 is held in association with the device ID 532 (corresponding to the specified device ID 501) and the expiration date 533. On the other hand, if the device ID 532 is already registered, the expiration date 531 of the registered association ID 533 is updated (extended). In step S606, the management server 103 transmits to the printer 101 a newly issued association ID 531 or the association ID 531 whose expiration date 533 has been updated as a response to the printer registration request made in step S602.

In step S607, the printer 101 transmits the association ID 531 received in step S606 to the service server 104. For example, the printer 101 transmits the association ID 531 to the service server 104 for which there is a desire to register to a service. In step S608, the service server 104 transmits a service registration request to the management server 103. A service registration request is a request for registering the service provided by the service server 104 in the management server 103. Here, the service server 104 transmits the service ID of its own service, the association ID received in step S607, and transmission destination information of its own service (for example, a URL).

In step S609, the management server 103 performs a service registration determination process. In step S609, the management server 103 determines whether or not the information of the service server 104 can be registered to the service management table 510. When it is determined that registration to the service management table 510 is possible, the printer 101 is registered in the service management table 510 and the service-specific device ID 512 is transmitted to the service server 104 in step S611. Meanwhile, when it is determined that it is impossible to register the service management table 510, that fact that it is impossible to register the service management table 510 is transmitted to the service server 104. The service registration determination process of step S609 will be described later with reference to FIG. 7.

In step S610, the management server 103 performs a service registration process. For example, the management server 103 holds in association the service ID received in step S608, the transmission destination information, and the service-specific device ID in the service management table 510 of FIG. 5B. In addition, information associated with the association ID 531 used for registering this service is removed from the association ID management table 530 of FIG. 5D. In step S611, the management server 103 transmits the service-specific device ID 512 to the service server 104.

In step S612, the management server 103 transmits the service information of the service server 104 to the printer 101. For example, as the service information, information necessary for the registration state of the service and the start of the service is transmitted.

As described above, in the system 10, when the request to register the printer 101 is made to the management server 103, something to that effect and temporary identification information (the association ID) is conveyed to the service server 104 in step S607. The service server 104 makes a service registration request to the management server 103. Then, the service server 104 receives the identification information (the service-specific device ID) of the printer 101 that performed the registration request from the management server 103. In the present embodiment, since the identification information of the printer 101 received at that time is common among grouped services, job management between grouped services can be simplified.

Figure 7:
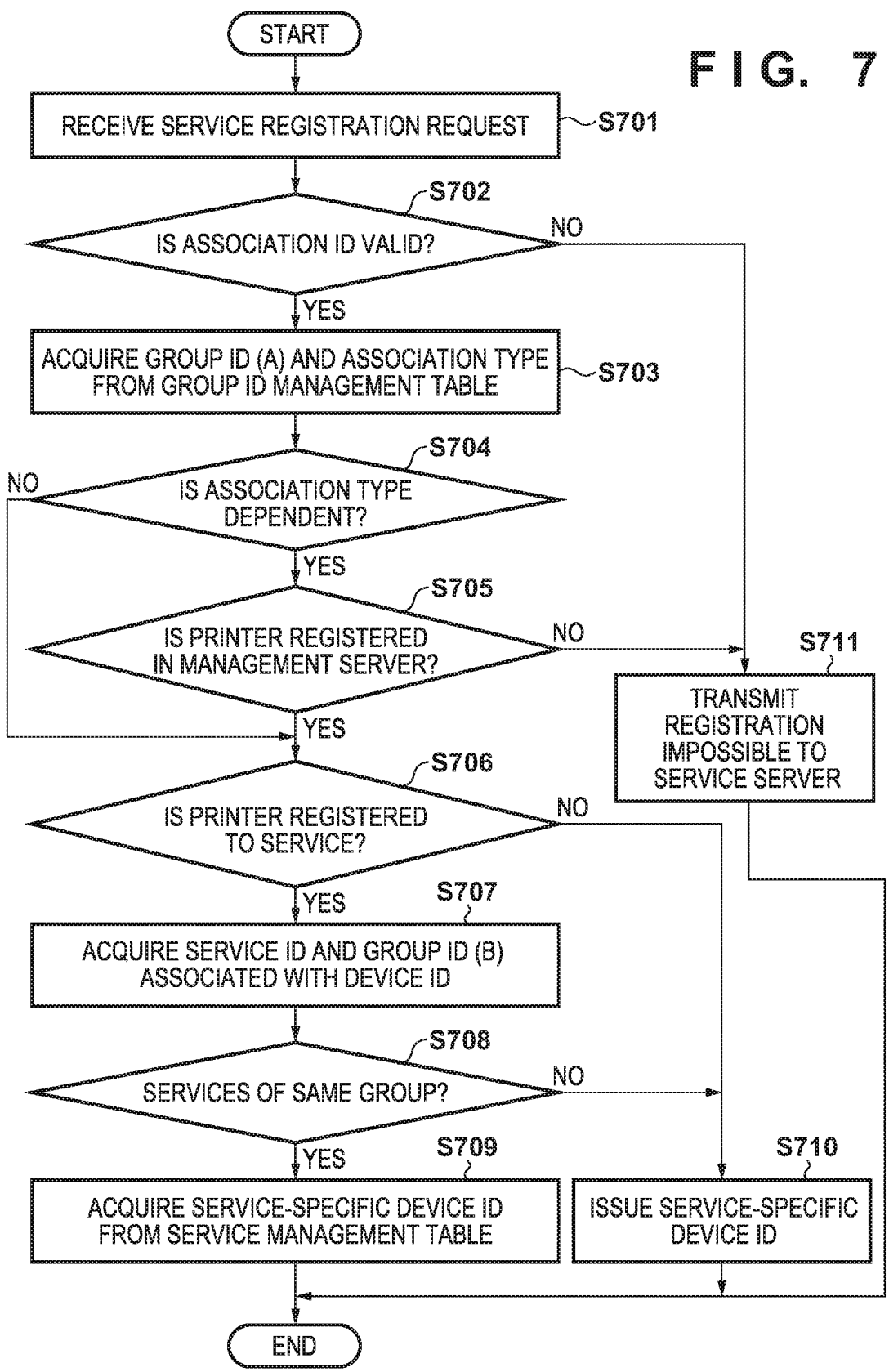
FIG. 7 is a flow chart showing a service registration determination process of step S609.

FIG. 7 is a flow chart showing the service registration determination process of step S609. The process of FIG. 7 is realized, for example, by the CPU 401 loading and executing a program stored in the storage unit 402. In step S701, the management server 103 receives the service registration request transmitted from the service server 104 together with the association ID 531, the service ID, and the transmission destination information.

In step S702, the management server 103 determines whether or not the association ID received in step S701 is valid. For example, the management server 103 determines whether or not the association ID received in step S701 is held in the association ID management table 530. Normally, the association ID should have been newly registered in step S605 or was already registered. Therefore, when it is determined that the association ID is not held in the association ID management table 530, it is determined that the association ID received in step S701 is not valid (e.g., invalid). In contrast, when it is determined that the association ID is held in the association ID management table 530, the management server 103 further determines whether the expiration date of the association ID has not expired based on the expiration date 533. Here, when it is determined that the expiration date of the association ID has not expired, the management server 103 determines that the association ID received in step S701 is valid. In contrast, when it is determined that the expiration date of the association ID has expired, the management server 103 determines that the association ID received in step S701 is not valid.

When it is determined that the association ID received in step S701 is not valid, the management server 103 notifies the service server 104 that registration to the service management table 510 is not possible (step S711). Thereafter, the processing of FIGS. 7 and 6 ends. On the other hand, when it is determined that the association ID received in step S701 is valid, the process proceeds from step S702 to step S703.

In step S703, the management server 103 refers to the group management table 520 of FIG. 5C to acquire the service group ID 521 and the association type 523 associated with the service ID received in step S701. Note that the management server 103 holds FIG. 5C in advance.

In step S704, the management server 103 determines whether or not the association type 523 acquired in step S703 is "dependent". Here, when it is determined that the association type is "dependent," the process proceeds to step S705, and the management server 103 determines whether or not the printer 101 has been registered in the management server 103. For example, the management server 103 refers to the association ID management table 530 to specify the device ID 532 corresponding to the association ID 531 acquired in step S701. The management server 103 determines whether or not a device ID 501 corresponding to the specified device ID 532 is held in the device management table 500. Here, when it is determined that it is not held in the device management table 500 (No in step S705), even though the association type 523 is "dependent", it means that the printer 101 is not registered in the management server 103. Therefore, the process proceeds to step S711, and the management server 103 notifies the service server 104 that registration to the service management table 510 is not possible. Thereafter, the processing of FIGS. 7 and 6 ends. In contrast, when Yes is determined in step S705, the process proceeds to step S706. Further, when it is determined that the association type 523 in step S704 is not dependent, for example, that it is "independent", the process of the management server 103 proceeds to step S706.

In step S706, the management server 103 determines whether or not the printer 101 has been registered to a service. For example, the management server 103 specifies the device ID 532 corresponding to the association ID 531 acquired in step S701. The management server 103 then determines whether or not a device ID 511 corresponding to the specified device ID 532 is held in the service management table 510. Here, when it is determined that the device ID is not held in the service management table 510 (No in step S706), the process proceeds to step S710, and the management server 103 issues a new service-specific device ID 512 and terminates the process of FIG. 7. The management server 103 issues the service-specific device ID and stores the corresponding device ID 511, service ID 513, and URL information 514 in the service management table 510. In this case, in step S611 which is a latter stage, the service-specific device ID 512 newly issued in step S710 is transmitted to the service server 104. A case where a new service-specific device ID 512 is issued indicates that the printer has not yet been registered to a grouped service. When this happens, a new service-specific device ID 512 is issued. In contrast, when Yes is determined in step S706, the process of the management server 103 proceeds to step S707.

In step S707, the management server 103 refers to the service management table 510 to acquire the service ID 513 associated with the device ID 511 corresponding to the device ID 532 corresponding to the association ID 531 acquired in step S701. Subsequently, the management server 103 refers to the group management table 520 and specifies the service group ID 521 corresponding to the service ID 522 corresponding to the service ID 513 acquired in step S707. Then, in step S708, the management server 103 determines whether the service group ID 521 acquired in step S703 and the service group ID 521 specified in step S707 are for the same group. Here, if it is determined that they are for the same group, the process proceeds to step S709. Firstly, the management server 103 refers to the association ID management table 530 to specify the device ID 532 corresponding to the association ID 531 acquired in step S701. The management server 103 refers to the service management table 510 to acquire the service-specific device ID 512 associated with the device ID 511 corresponding to the specified device ID 532, and ends the process of FIG. 7. In this case, in step S611 which is a latter stage, the service-specific device ID 512 acquired in step S709 is transmitted to the service server 104. A case in which such processing is performed will be described. A service that made the service registration request and another service belong to the same group. A case for which Yes is determined in step S708 indicates that the printer has already been registered for another service of the group. In that case, the service-specific device ID 512 that has been already issued is transmitted to the service server 104.

On the other hand, if it is determined in step S708 that the service group IDs are not for the same group, the process proceeds to step S710, and the management server 103 issues a new service-specific device ID 512. Thereafter, the processing of FIG. 7 ends. In this case, in step S611 which is a latter stage, the service-specific device ID 512 newly issued in step S710 is transmitted to the service server 104. A case in which such processing will be described. A service that made the service registration request and another service belong to different groups. A case for which No is determined in step S708 indicates that the printer has already been registered to another service of a different group. In this case, a service-specific device ID 512 is issued newly because the printer is still not registered to the grouped service. The management server 103 issues the service-specific device ID and stores the corresponding device ID 511, service ID 513, and URL information 514 in the service management table 510.

The processing of FIG. 7 will be described by way of example. For example, the association ID received in step S701 is set to "Connect_b" and the service ID is set to "Service_b."

In step S702, since "Connect_b" is held in the association ID management table 530, it is determined that the association ID 531 is valid, and the process proceeds to step S703. In step S703, the service group ID 521 "Group_a" corresponding to "Service_b" and the association type 523 "dependent" are acquired from the group management table 520. Thus, the process proceeds from step S704 to step S705. In step S705, because the device ID 532 "Device_b" corresponding to the association ID 531 acquired in step S701 is held in the device management table 500, the process proceeds to step S706.

In step S706, it is determined that the device ID 532 "Device_b" corresponding to the association ID 531 "Connect_b" acquired in step S701 is held in the service management table 510, and the process proceeds to step S707. In step S707, the service ID 513 "Service_a" corresponding to the device ID 532 "Device_b" corresponding to the association ID 531 "Connect_b" acquired in step S701 is acquired.

In step S708, it is determined whether the service group ID 521 "Group_a" acquired in step S703 and the service group ID 521 "Group_a" corresponding to the service ID 513 "Service_a" acquired in step S707 are for the same group. In step S709, the service-specific device ID 512 "Service_Device_3" corresponding to the device ID 532 "Device_b" corresponding to the association ID 531 "Connect_b" acquired in step S701 is acquired. In this case, in step S611 which is a latter stage, the service-specific device ID 512 "Service_Device_3" acquired in step S709 is transmitted to the service server 104.

By virtue of the present embodiment as described above, when the service of the service server 104 and the service corresponding to the device already registered belong to the same group, the service-specific device ID issued to the services in the group is transmitted to the service server 104. With such a configuration, when different services belong to the same group, the management server 103 can manage a device (for example, the printer 101) by a common service-specific device ID 512. As a result, according to the present embodiment, for example, it is possible to reduce processing for issuing an ID in the management server 103.

<Removal Process Executed by System>

Figure 8:
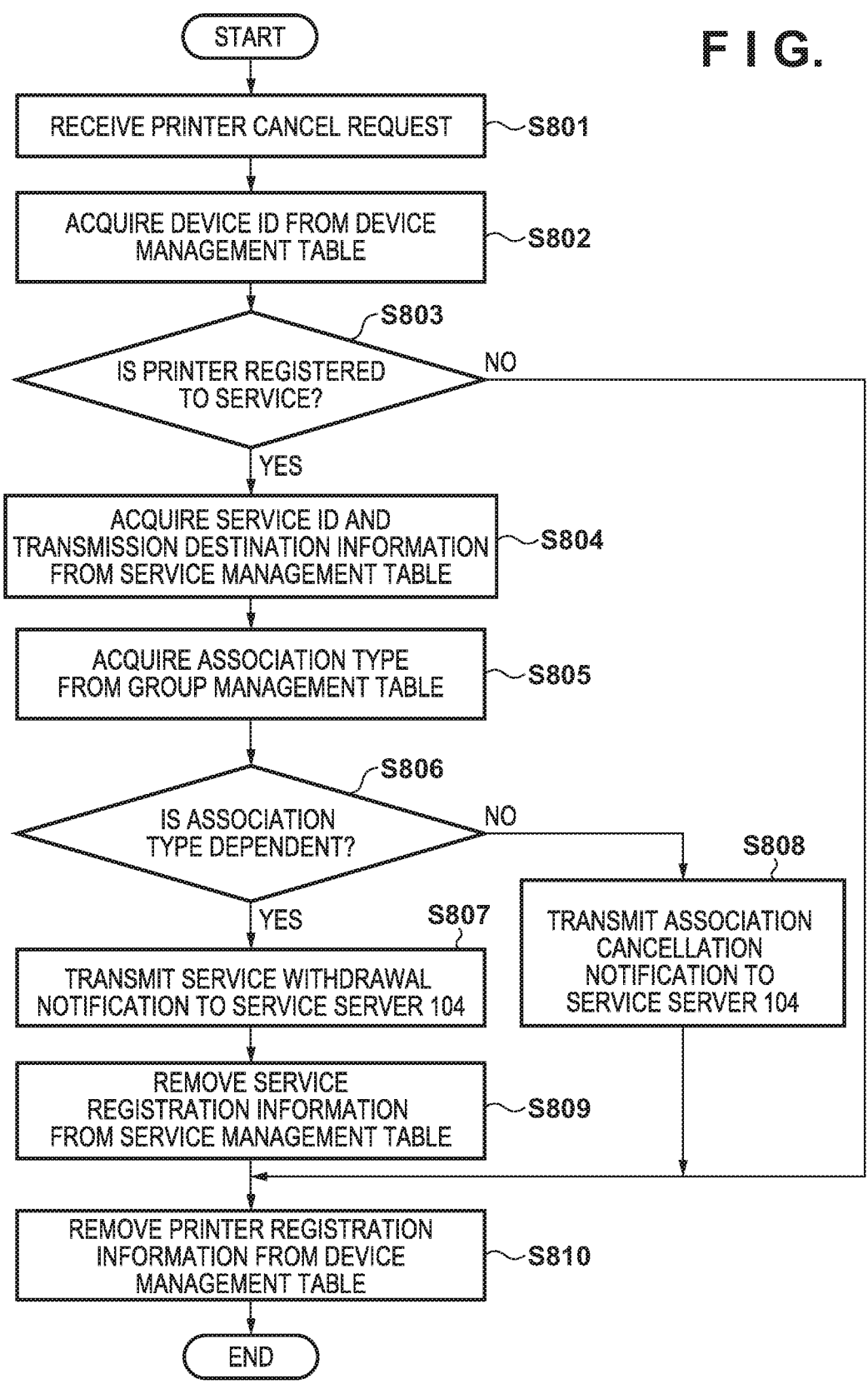
FIG. 8 is a flow chart illustrating a printer removal process.

Hereinafter, the printer removal process in the system 10 will be described with reference to FIG. 8. The process of FIG. 8 is realized, for example, by the CPU 401 loading and executing a program stored in the storage unit 402. In step S801, the management server 103 receives a printer cancel (registration removal) request from the printer 101. The printer cancel request is transmitted, for example, when an instruction operation that makes the printer be excluded from a management target of the management server 103, for example an operation of disabling the information transmission setting, is accepted from a user via the operation unit 209. In step S801, the management server 103 receives device information such as a serial number, a MAC address, and a model number from the printer 101.

In step S802, the management server 103 refers to the device management table 500 to acquire the device ID 501 associated with the device information acquired in step S801. In step S803, the management server 103 determines whether or not the printer 101 has been registered to a service. For example, the management server 103 determines whether or not the device ID 501 acquired in step S802 is held in the service management table 510. Here, when it is determined that the device ID is not held in the service management table 510, the process proceeds to step S810, and the management server 103 removes the device information associated with the device ID 501 acquired in step S802 from the device management table 500. Thereafter, the processing of FIG. 8 ends. On the other hand, when it is determined that the device ID is held in the service management table 510, the process of the management server 103 proceeds to step S804.

In step S804, the management server 103 refers to the service management table 510 to acquire the service ID 513 and the transmission destination information 514 corresponding to the device ID 511 corresponding to the device ID 501 acquired in step S802. In step S805, the management server 103 refers to the group management table 520 to acquire the association type 523 associated with the service ID 522 corresponding to the service ID 513 acquired in step S804.

In step S806, the management server 103 determines whether or not the association type 523 acquired in step S805 is "dependent". Here, when it is determined that the association type is not "dependent", for example, "independent," the process proceeds to step S808, and the management server 103 transmits to the service server 104 a cancellation notification indicating that the association with the device (e.g., the printer 101) and the service has been canceled. For example, in a case where a cancel request is received from the Device_a printer, Service_a to Service_c are associated with Device_a as is evident from FIG. 5B. Therefore, the process of step S806 to step S810 is executed for these three services. For example, the management server 103 determines No in step S806 in a case of processing the Service_c. The management server 103 transmits the cancellation notification using the URL information of the Service_c. In step S810, the management server 103 removes the device information associated with the device ID 501 acquired in step S802 from the device management table 500. Thereafter, the processing of FIG. 8 ends. In contrast, when it is determined that the association type 523 is "dependent", the process proceeds to step S807.

In step S807, the management server 103 transmits a service withdrawal notification to the service server 104. In step S809, the management server 103 removes the service information associated with the device ID 511 corresponding to the device ID 501 acquired in step S802 from the service management table 510. Note that the information to be removed here is the service-specific device ID 512, the service ID 513, and the transmission destination information 514. If it is determined that the type is independent, the service information is not removed. This point is one difference between the processing performed for the independent type and the processing performed for the dependent type. In step S810, the management server 103 removes the device information associated with the device ID 501 acquired in step S802 from the device management table 500. Thereafter, the processing of FIG. 8 ends.

As described above, according to the processing of FIG. 8, when a printer cancel request is received from the printer 101 and the association type 523 is "dependent," the management server 103 cancels the printer registration. Further, the management server 103 also cancels the association with the service and notifies the service server 104 of the service withdrawal. Meanwhile, in a case where the association type 523 is "independent", while the printer registration is canceled, the service registration is not canceled and the service server 104 is notified that the association between the printer 101 and the service has been canceled. With such a configuration, flexible management can be performed according to the association type 523 of a service.

By virtue of the present embodiment as described above, according to the registration state of the printer 101 in the management server 103, it is possible to issue the identification information of a device in units of groups of services and to remove the registration of a device in units of groups of services. Further, because the management server 103 notifies the service server 104 of the identification information of a device in units of service groups, it is possible to improve the efficiency of device management among grouped services. Although the printer 101 is described as a device in the present embodiment, there is no limitation to the printer 101, and a PC or a mobile terminal may be a device according to the present embodiment.

Second Embodiment

In the present embodiment, description is given regarding a configuration for a case of performing additional service registration. In this case, an additional service is registered by using a service-specific device ID within the same group without using the association ID 530. Hereinafter, regarding the second embodiment, a description will be given of points different from the first embodiment. Describing with reference to FIG. 9, while the association ID 530 is used when registering a service A of a service A server 104, but the association ID 530 is not used when registering a service B of a service B server 104.

Figure 9:
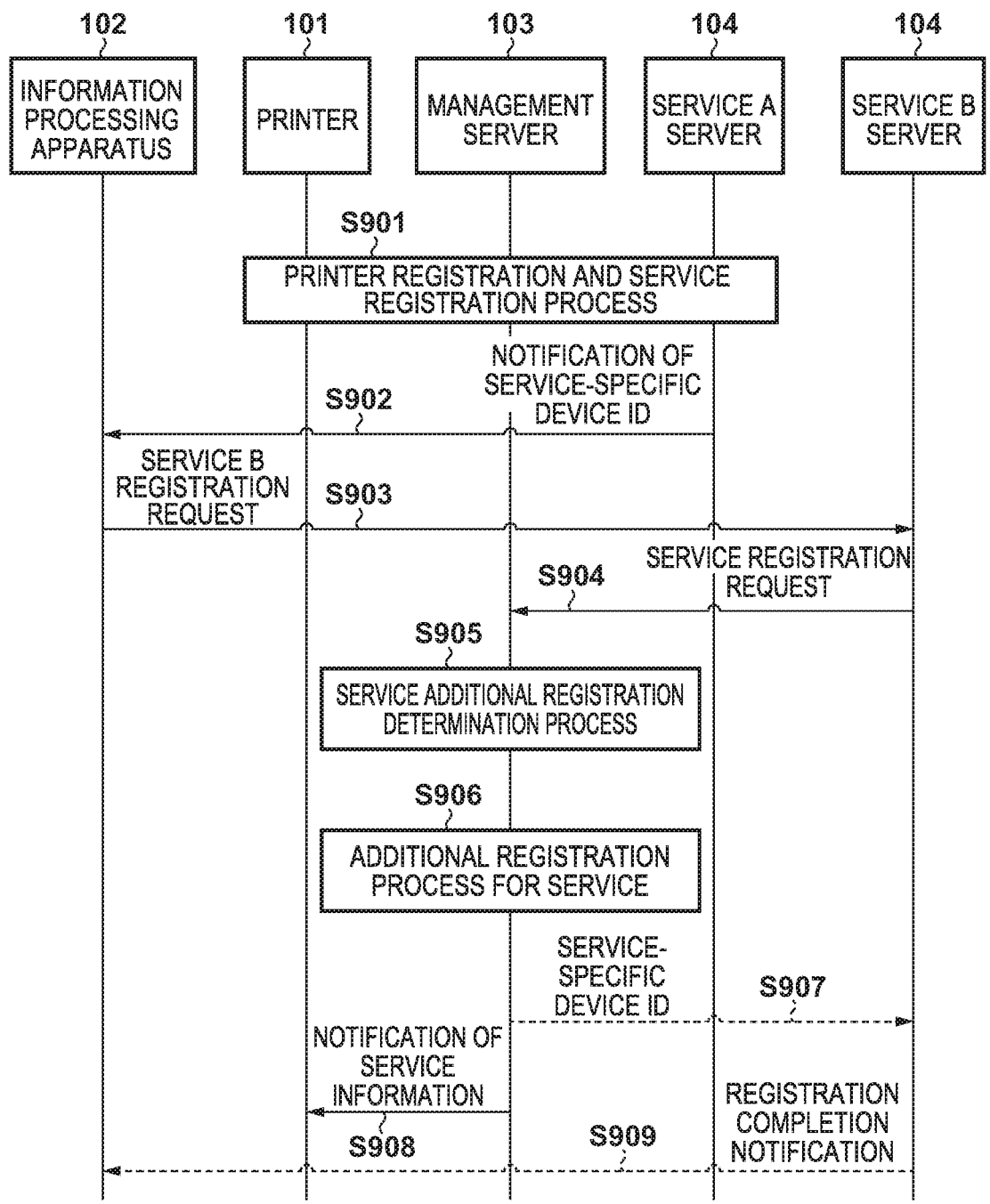
FIG. 9 is a sequence diagram of additional registration of a service.

FIG. 9 is a sequence diagram of additional registration for a service. In FIG. 9, it is assumed that the service server 104 providing the service A is the service A server 104, and the server providing the service B is the service B server 104, and it is assumed that these services belong to the same group. In the present embodiment, a Web browser or an application for registration that is stored in the storage unit 302 of the information processing apparatus 102 is used for additional registration of the service B, and registration processing is performed via the Web. Processing by the printer 101 of FIG. 9 is realized by the CPU 205 executing programs. Processing of the management server 103, the service A server 104, and the service B server is realized by the CPU 401 of each server executing programs. Processing by the information processing apparatus 102 is realized by the CPU 301 executing programs.

In step S901 which is performed between the printer 101, the management server 103, and the service A server 104, processing for step S601 to step S612 of FIG. 6 is performed. That is, since description for the processing of step S901 is the same as that for step S601 to step S612 of FIG. 6, the description is omitted.

In step S902, the service A server 104 transmits the service-specific device ID to the information processing apparatus 102. In step S903, the information processing apparatus 102 transmits a service registration request to the service B server 104. At this time, the information processing apparatus 102 transmits the service-specific device ID received in step S902 together with the service registration request. For example, when the application for registration is used, a service registration request is set in advance with respect to the service B server 104. Also, if a web browser is used, an add button for the service B is displayed on a screen which is displayed in response to the notification of step S902. Configuration may be such that, if a user presses the add button, step S903 is executed.

In step S904, the service B server 104 transmits a service registration request to the management server 103. At this time, the service B server 104 transmits its own service ID, the service-specific device ID received in step S903, and its own transmission destination information, together with the service registration request.

In step S905, the management server 103 performs a service addition registration determination process. Details of the service addition registration determination process will be described later with reference to FIG. 10.

In step S906, the management server 103 performs an additional registration process for a service. For example, using the service management table 510 of FIG. 5B, the management server 103 holds in association the service ID, the transmission destination information, and the service-specific device ID that were acquired in step S904. In step S907, the management server 103 transmits the service-specific device ID to the service B server 104. In step S908, the management server 103 transmits the service information to the printer 101. For example, as the service information, information necessary for the registration state of the service and the start of the service is transmitted. In step S909, the service B server 104 transmits a registration completion notification indicating that the service registration has been completed to the information processing apparatus 102.

Figure 10:
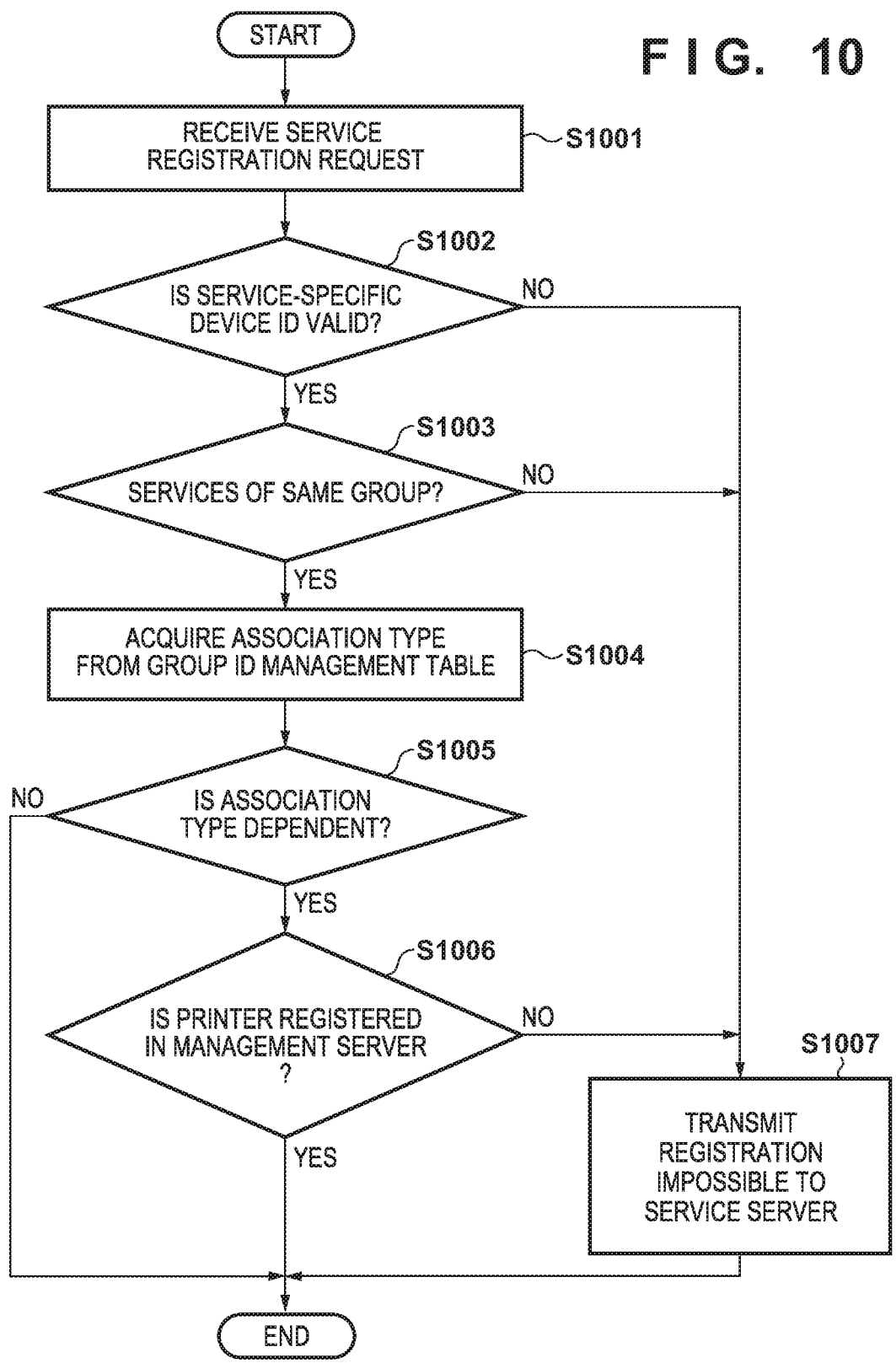
FIG. 10 is a flowchart showing an additional registration process for a service in the management server.

FIG. 10 is a flow chart for additional registration of a service in the management server 103. The process of FIG. 10 is realized, for example, by the CPU 401 loading and executing a program stored in the storage unit 402. The process of FIG. 10 is started when a service registration request is received in step S904 of FIG. 9.

In step S1001, the management server 103 receives the service registration request transmitted from the service B server 104 and receives the service-specific device ID, the service ID, and the transmission destination information.

In step S1002, the management server 103 determines whether or not the service-specific device ID received in step S1001 is valid. For example, the management server 103 determines whether or not the service-specific device ID received in step S1001 is held in the service management table 510. Here, when it is determined that the service-specific device ID is not held, it is determined that the service-specific device ID received in step S1001 is not valid (for example, it is invalid). In step S1007 the management server 103 notifies the service B server 104 that registration to the service management table 510 is not possible. Thereafter, the processing of FIGS. 10 and 9 ends. On the other hand, when it is determined that the service-specific device ID received in step S1001 is valid, the process proceeds from step S1002 to step S1003.

In step S1003, the management server 103 refers to the service management table 510 to acquire the service ID 513 associated with the service-specific device ID received in step S1001. Then, the management server 103 determines whether or not the service group to which the acquired service ID 513 belongs and the service group to which the service ID received in step S1001 belongs are the same group. Here, when it is determined that the groups are not the same, the processing proceeds to step S1007, and the management server 103 notifies the service B server 104 that registration to the service management table 510 of the printer 101 is not possible. Thereafter, the processing of FIGS. 10 and 9 ends. In contrast, if it is determined that they are for the same group, the process proceeds to step S1004.

In step S1004, the management server 103 refers to the group management table 520 to acquire the association type 523 associated with the service ID 522 corresponding to the service ID received in step S1001. In step S1005, the management server 103 determines whether or not the association type 523 acquired in step S1004 is "dependent". Here, when it is determined that it is not "dependent", for example, that it is "independent", the processing of FIG. 10 ends. In this case, in step S907 which is a latter stage, the service-specific device ID received in step S1001 and held in the service management table 510 in step S906 is transmitted to the service B server 104. In contrast, if it is determined that the association type is "dependent", the process proceeds to step S1006.

In step S1006, the management server 103 determines whether or not the printer 101 has been registered to the management server 103. For example, the management server 103 determines whether or not the device ID 501 corresponding to the device ID 511 corresponding to the service-specific device ID received in step S1001 is held in the device management table 500. Here, when it is determined that it is not held in the device management table 500, even though the association type 523 is "dependent", it means that the printer 101 is not registered in the management server 103. Accordingly, the process proceeds to S1007, and the management server 103 notifies the service B server 104 that registration of the printer 101 to the service management table 510 is not possible. Thereafter, the processing of FIGS. 10 and 9 ends. On the other hand, when it is determined that the device ID is held in the device management table 500, the process of FIG. 10 ends. In this case, in step S907 which is a latter stage, the service-specific device ID received in step S1001 and held in the service management table 510 in step S906 is transmitted to the service B server 104.

By virtue of the present embodiment as described above, the management server 103 can perform additional registration processing for a service by using the service-specific device ID within the same group without issuing the association ID. In the present embodiment, the service-specific device ID is transmitted to the service B server 104 through the information processing apparatus 102, but may be transmitted directly between the service servers. Further, in the present embodiment, a configuration in which a plurality of services are provided by different devices such as a service A server 104 and a service B server 104 has been described. However, even with a configuration where a plurality of services is provided by a single service server, the operation of the present embodiment can be applied. In this case, the additional registration process for a service of the present embodiment can be executed by transmitting and receiving the service-specific device ID between the plurality of services in the one service server.

Third Embodiment

In the present embodiment, an example of a configuration for managing jobs between services by using a service-specific device ID within the same group will be described. Hereinafter, regarding the third embodiment, description will be given of points different from the first and second embodiments.

Figure 11:
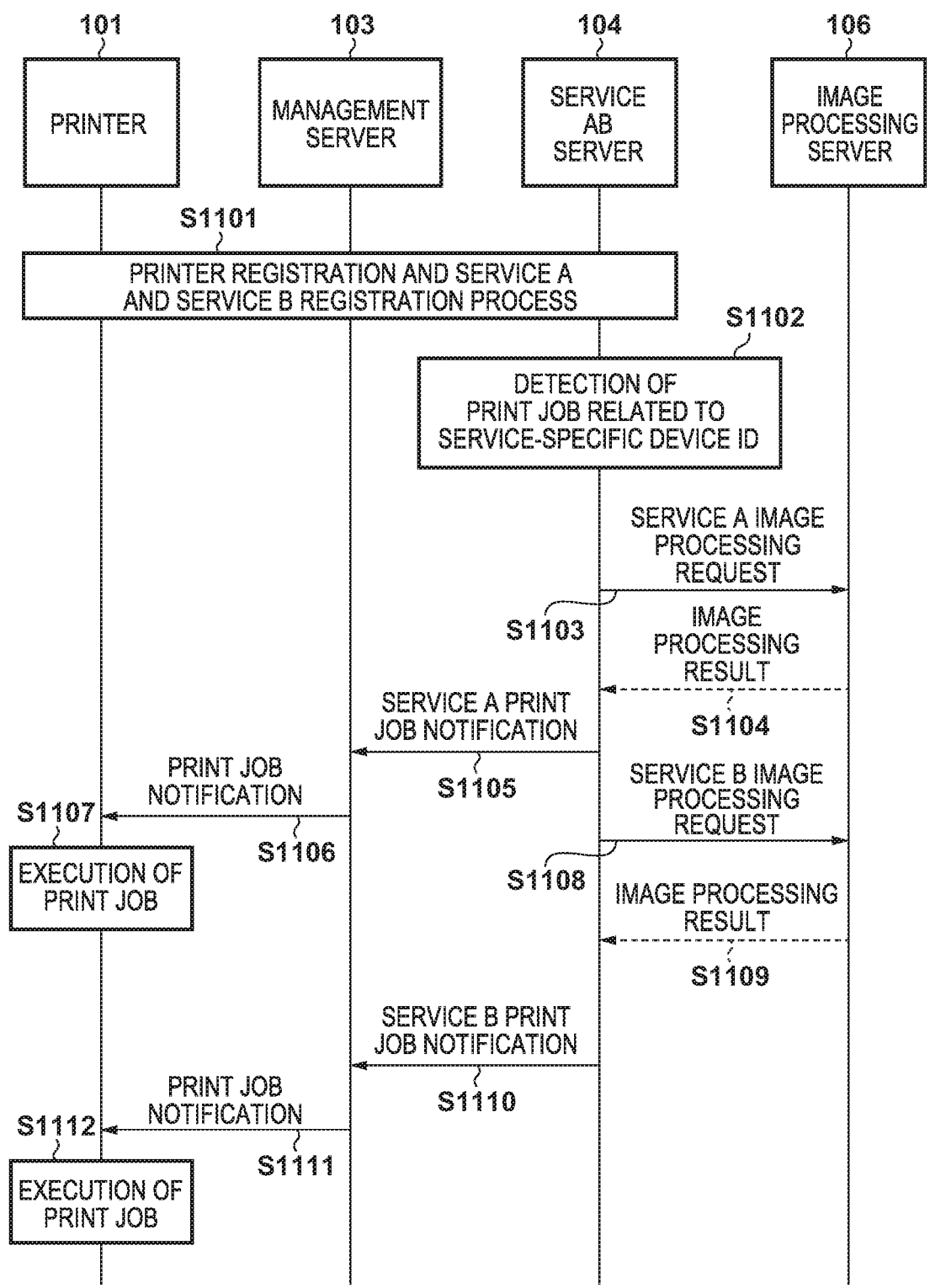
FIG. 11 is a sequence diagram of a print job process when a plurality of services are linked.

FIG. 11 is a sequence diagram relating to processing for print jobs when a plurality of services are linked. In the present embodiment, it is assumed that the service server 104 that provides a service A and a service B is a service AB server 104, and the service A and the service B are in the same group. Processing by the printer 101 of FIG. 11 is realized by the CPU 205 executing programs. Processing of the management server 103, the service AB server 104, and the image processing server 106 is realized by the CPU 401 of each server executing programs.

In step S1101, which is performed among the printer 101, the management server 103, and the service AB server 104, the processing in step S601 to step S612 of FIG. 6 is performed for the service A, and the processing in step S601 to step S612 of FIG. 6 is performed for the service B. That is, since description for the processing of step S1101 is the same as that for step S601 to step S612 of FIG. 6, the description is omitted. Alternatively, the process of FIG. 6 may be performed for the service A, and the process of FIG. 9 may be performed for the additional registration of the service B.

In step S1102, the service AB server 104 detects a print job relating to a service-specific device ID. In this case, respective print jobs of the service A and the service B associated with the service-specific device ID are detected. The service AB server 104 queues the detected respective print jobs of the service A and service B.

In step S1103, the service AB server 104 requests the image processing server 106 for image processing relating to the print job of the service A detected in step S1102. At this time, the model information 502 to 505 associated with the device ID 501 corresponding to the device ID 511 corresponding to the service-specific device ID 512 is transmitted. Note that the image processing server 106 switches, in units of devices, the image processing method to be executed on the basis of the information. Further, in the present embodiment, the tables of FIG. 5A to FIG. 5D held by the management server 103 are shared with the service AB server 104. In step S1104, the image processing server 106 transmits an image processing result to the service AB server 104 after the image processing is completed. In step S1105, the service AB server 104 transmits to the management server 103 the print job for the service A, the service-specific device ID, and the image processing result received in step S1104.

In step S1106, the management server 103 refers to the service management table 510 to acquire the model information associated with the device ID 501 corresponding to the device ID 511 corresponding to the service-specific device ID received in step S1105. The management server 103 transmits a print job to the printer 101 identified by the model information. In step S1107, the printer 101 executes the print job received in step S1106.

In step S1108, the service AB server 104 requests the image processing server 106 for image processing relating to the print job of the service B detected in step S1102. At this time, the model information associated with the device ID 501 corresponding to the device ID 511 corresponding to the service-specific device ID 512 is transmitted. In step S1109, the image processing server 106 transmits an image processing result to the service AB server 104 after the image processing is completed. In step S1110, the service AB server 104 transmits to the management server 103 the print job for the service B, the service-specific device ID, and the image processing result received in step S1109.

In step S1111, the management server 103 refers to the service management table 510 to acquire the model information associated with the device ID 501 corresponding to the device ID 511 corresponding to the service-specific device ID received in step S1110. The management server 103 transmits a print job to the printer 101 identified by the model information. In step S1112, the printer 101 executes the print job received in step S1111.

As described above, the management server 103 returns a common service-specific device ID in the same group to the service AB server 104 to thereby make it possible to uniquely specify the printer 101 among the service servers of the same group. That is, when the device ID for the service A and the device ID for the service B are different, the management server 103 needs to issue many IDs, thereby increasing the load of issuing IDs. Also, when there is a massive amount of IDs, the processing load for specifying a printer increases when notifying the print job. However, in the present embodiment, since the device ID for the service A and the device ID for the service B are the same, the load of issuing an ID by the management server 103 can be reduced. Also, in the present embodiment, it is possible to reduce the processing load for specifying a printer when notifying a print job. Therefore, it is possible to optimize management of jobs such as queuing and image processing for print jobs among a plurality of services.

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2019-119111, filed Jun. 26, 2019, which is hereby incorporated by reference herein in its entirety.

What is claimed is:

1. A management system comprising a management apparatus operable to manage a device in association with a service, the device, and at least one service server operable to provide the service,
the device comprising at least one memory and at least one processor and/or at least one circuit which function as a first control unit,
the management apparatus comprising at least one memory and at least one processor and/or at least one circuit which function as a second control unit, and
the at least one service server comprising at least one memory and at least one processor and/or at least one circuit which function as a third control unit,
wherein
the first control unit of the device performs control to transmit to the management apparatus a request to register the device,
the second control unit of the management apparatus, after receiving the request performs control to transmit to the device association identification information;
the first control unit of the device performs control to transmit the association identification information to a first service server;
the third control unit of the first service server performs control to transmit the association identification information to the management apparatus;
the second control unit of the management apparatus performs control to determine whether a second service which has already been registered for the device and a first service of the first service server belong to a same group in a state that the first service is not registered for the device, wherein the second service is provided by a second service server,
if the second service and the first service are determined to belong to the same group in the state that the first service is not registered for the device, the second control unit of the management apparatus performs control to transmit first service-specific device identification information, which is common with device identification information used to manage the device in the second service, to the first service server, and
if the second service and the first service are not determined to belong to the same group in the state that the first service is not registered for the device, the second control unit of the management apparatus performs control to transmit second service-specific device identification information different from the first service-specific device identification information to the first service server,
wherein the first and second service-specific device identification information are issued for the device.

2. The management system according to claim 1, wherein the third control unit of the first service server performs control to transmit to the management apparatus the association identification information and information unique to the first service server.

3. The management system according to claim 2, wherein the information unique to the first service server includes identification information of the service provided by the first service server.

4. The management system according to claim 1, wherein the second control unit of the management apparatus performs control to transmit information related to the service to the device after the first or second service-specific device identification information is issued.

5. The management system according to claim 1, wherein the device has a printing function.

6. The management system according to claim 1, wherein the device has a scan function.

7. The management system according to claim 1, wherein the second control unit of the management apparatus performs control to determine whether an expiration date of the association identification information received from the first service server has expired or not, and
if the expiration date is determined to have expired, the management apparatus transmits to the first service server information indicating that a registration is not possible.

8. The management system according to claim 1, wherein, if the association identification information received from the first service server is information which was not transmitted to any devices, the second control unit of the management apparatus performs control to transmit to the first service server information indicating that a registration is not possible.

9. A management apparatus comprising:
at least one memory that stores instructions; and
at least one processor that, upon executing the stored instructions, functions as:
a first transmission unit configured to transmit to a device association identification information, after receiving a request to register the device from the device;
a reception unit configured to receive the association identification information from a first service server, based on that the device transmitted the association identification information to the first service server;
a determination unit configured to determine whether a second service which has already been registered for the device and a first service of the first service server belong to a same group in a state that the first service is not registered for the device, wherein the second service is provided by a second service server;
a second transmission unit configured to, if the second service and the first service are determined to belong to the same group in the state that the first service is not registered for the device, transmit first service-specific device identification information, which is common with device identification information used to manage the device in the second service, to the first service server, and
a third transmission unit configured to, if the second service and the first service are not determined to belong to the same group in the state that the first service is not registered for the device, transmit second service-specific device identification information different from the first service-specific device identification information to the first service server,
wherein the first and second service-specific identification information are issued for the device.

10. The management apparatus according to claim 9, wherein the device has a printing function.

11. The management apparatus according to claim 9, wherein the device has a scan function.

12. The management apparatus according to claim 9, wherein the management apparatus determines whether an expiration date of the association identification information received from the first service server expires or not, and
if the expiration date is determined to expire, the management apparatus transmits to the first service server information indicating that registration is not possible.

13. The management apparatus according to claim 9, wherein, if the association identification information received from the first service server is information which was not transmitted to any devices, the management apparatus transmits to the first service server information indicating that registration is not possible.

* * * * *